United States Patent [19]

Seki et al.

[11] Patent Number: 5,028,923
[45] Date of Patent: Jul. 2, 1991

[54] ISO/EIA CODE CONVERTING METHOD

[75] Inventors: Masaki Seki; Takashi Takegahara, both of Tokyo; Katsunobu Yamaki, Yamanashi, all of Japan

[73] Assignee: Fanuc Ltd, Minamitsuru, Japan

[21] Appl. No.: 415,273

[22] PCT Filed: Jan. 23, 1989

[86] PCT No.: PCT/JP89/00058
§ 371 Date: Sep. 26, 1989
§ 102(e) Date: Sep. 26, 1989

[87] PCT Pub. No.: WO89/07290
PCT Pub. Date: Aug. 10, 1989

[30] Foreign Application Priority Data

Jan. 29, 1988 [JP] Japan .................. 63/018700

[51] Int. Cl.$^5$ .................. H03M 7/00; H03M 7/42; G06F 15/46
[52] U.S. Cl. .................. 341/106; 341/50; 341/55; 341/82; 364/474.23; 364/192
[58] Field of Search .................. 341/50, 55, 82, 106; 364/474.23, 474.22, 474.24, 474.25, 474.26, 474.27, 474.29, 190, 191, 192; 318/568.1

[56] References Cited

U.S. PATENT DOCUMENTS 4,050,001 9/1977 Kishi et al. .................. 364/474.23 X
4,587,608 5/1986 Kishi et al. .................. 364/474.23
4,890,234 12/1989 Tanaka et al. .................. 364/474.23

FOREIGN PATENT DOCUMENTS 62-75810 4/1987 Japan .

Primary Examiner—A. D. Pellinen
Assistant Examiner—Sharon D. Logan
Attorney, Agent, or Firm—Staas & Halsey

[57] ABSTRACT

A code conversion system including a table (EIT) for converting an ISO code and an EIA code into an internal code. Characters and numerals which make common use of the ISO code and EIA code are converted into the same internal code, and characters and numerals which do not make common use of the ISO code and EIA code are converted into respective separate internal codes and stored. The code conversion system also includes a first internal code into the EIA code and a second internal code conversion table (ICT) for converting the internal code into the ISO code. At the time of output, one of the ISO code and EIA code is designated as an output code system, the internal code is output upon being the internal code conversion table corresponding to the designated output code system, and undefined codes are not output in the designated output code system.

13 Claims, 4 Drawing Sheets

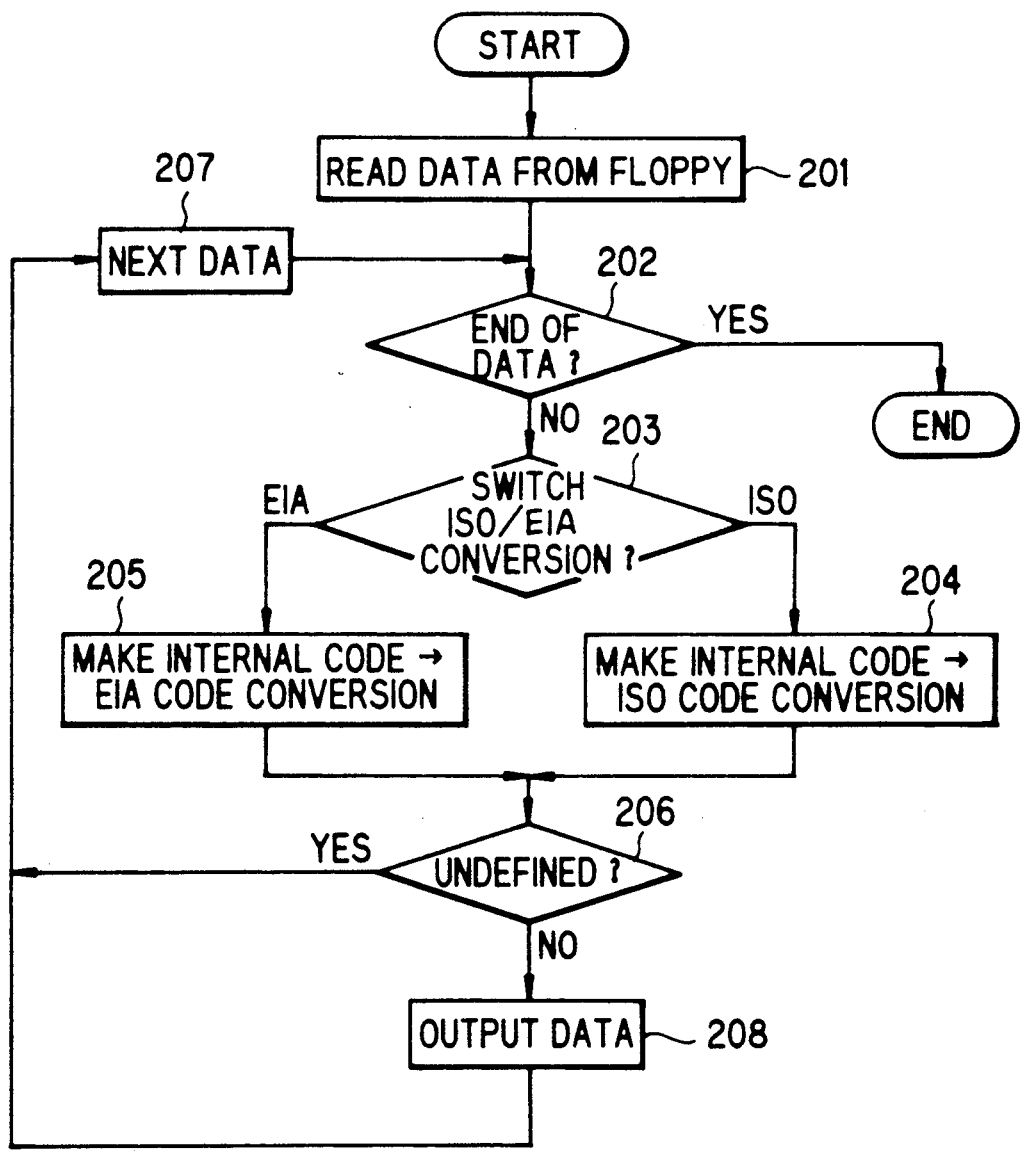

ISO/EIA CODE CONVERTING METHOD

BACKGROUND OF THE INVENTION a. Field of the Invention

This invention relates to an ISO/EIA code conversion method and, more particularly, to an ISO/EIA code conversion method in an NC data input/output unit capable of using an ISO code and an EIA code.

b. Description of the Related Art

In an automatic programming apparatus which automatically creates NC data, the NC data are created in either an ISO code or EIA code system and stored on an external storage medium such as a hard disk. At the time of use, the desired NC data are read out of the external storage medium to perform NC control.

Conventionally, the NC data created by such an automatic programming apparatus are input to or output from the external storage medium through any of the methods (1)-(3) described below.

(1) The code system of the NC data to be input is designated and then only the NC data of the designated code system are input to the external storage medium. At the time of output, the NC data of the input code system are output as is. For example, since an ISO code is an eight-bit code of even parity and an EIA code is an eight-bit code of odd parity, the code system of the input NC data is identified by the parity. The identified code system and a code system designated in advance are compared, only the NC data of the designated code system are stored on the external storage medium, and these data are output in response to a request.

(2) The code system of the NC data to be input are discriminated automatically, only data such as character or numeral data in which both the ISO and EIA codes are used while having the same meaning are converted into an internal code and stored, whereas data (referred to as a characteristic code) in which the ISO and EIA codes are used while having their own meanings, and which include undefined codes, are neglected without being converted into an internal code. At the time of output, the data converted into the internal code are output upon being converted into data of the code system designated at output time.

(3) The characteristic code neglected and not converted in method (2) is registered separately, and if the code system of the data output in (2) and the registered code system are the same, the data are output.

However, with the input/output processing of NC data in method (1), a problem encountered is that the method cannot be used in a case where the input code system and output code system differ. With the input/output processing of NC data in method (2), the characteristic code is neglected without relation to the input code system and output code system. Therefore, all of the data at the time of input cannot be stored in the external storage medium. With the input/output processing of NC data in method (3), the characteristic code must be separately registered and the registration operation is very troublesome.

Accordingly, an object of the present invention is to provide an ISO/EIA code conversion method in which storage is possible irrespective of the code system, input data can be output as is in a case where the input code system and output code system are the same, and an undefined code can be neglected and output in a designated code system in a case where the code systems differ.

SUMMARY OF THE INVENTION

In an ISO/EIA code conversion method according to the invention, there are provided a first conversion table for converting an ISO code and an EIA code into an internal code, and a second table for converting the internal code into an ISO code and EIA code. Characters and numerals in which the ISO code and EIA code are both employed are converted into the same internal code using the first conversion table, and characters and numerals in which the ISO code and EIA code are not both employed are converted into respective separate internal codes and stored. At the time of output, an output code system of the ISO code and EIA code for the output is designated, the internal code is output upon being converted into the designated code system by using the second conversion table, and the undefined codes are not output in the designated code system.

BRIEF DESCRIPTION OF THE DRAWINGS

FIG. 4 is a flowchart of output conversion processing in the present invention.

DESCRIPTION OF THE PREFERRED EMBODIMENT

Figure 1:
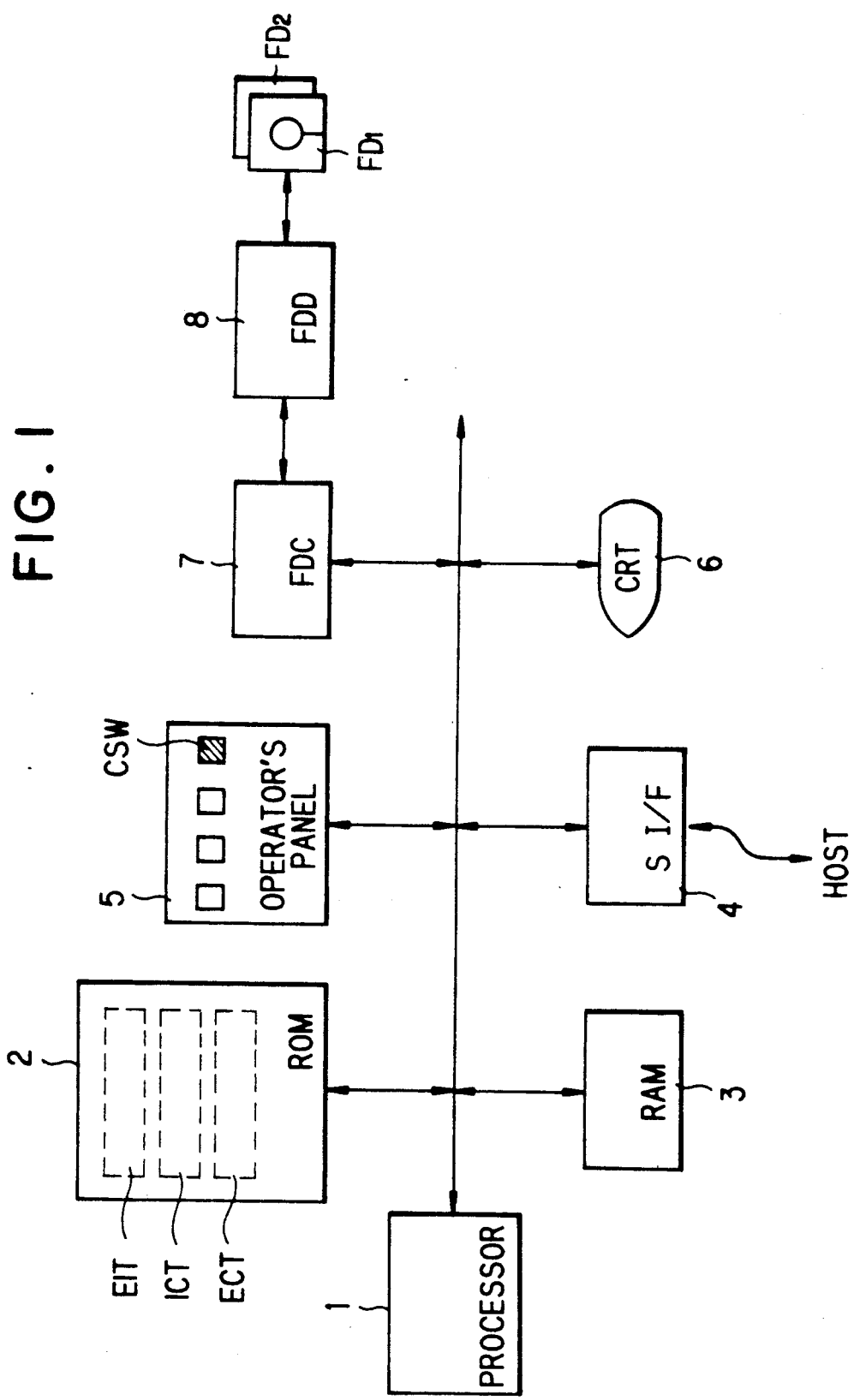
FIG. 1 is a block diagram of a system for practicing the method of the invention.

FIG. 1 is a block diagram of a system (program file system) for practicing the present invention.

Numeral 1 denotes a processor and numeral 2 denotes a ROM storing a control program, a conversion table EIT for converting an eight-bit ISO or EIA code into an internal code, a conversion table ICT for converting an internal code into an ISO code, and a conversion table ECT for converting an internal code into an EIA code. Numeral 3 denotes a RAM for storing the results of processing and the like, 4 denotes an interface (e.g., a serial I/F conforming to RS-232-C) for a bit-serial data exchange with a host (automatic programming apparatus) or the like, 5 denotes an operator's panel, 6 denotes a display unit, (CRT), 7 denotes a floppy disk controller (FDC), 8 denotes a floppy disk drive (FDD), and FD1, FD2 denotes floppy disks. An ISO/EIA setting switch CSW is disposed on the operator's panel 5.

Figure 2:
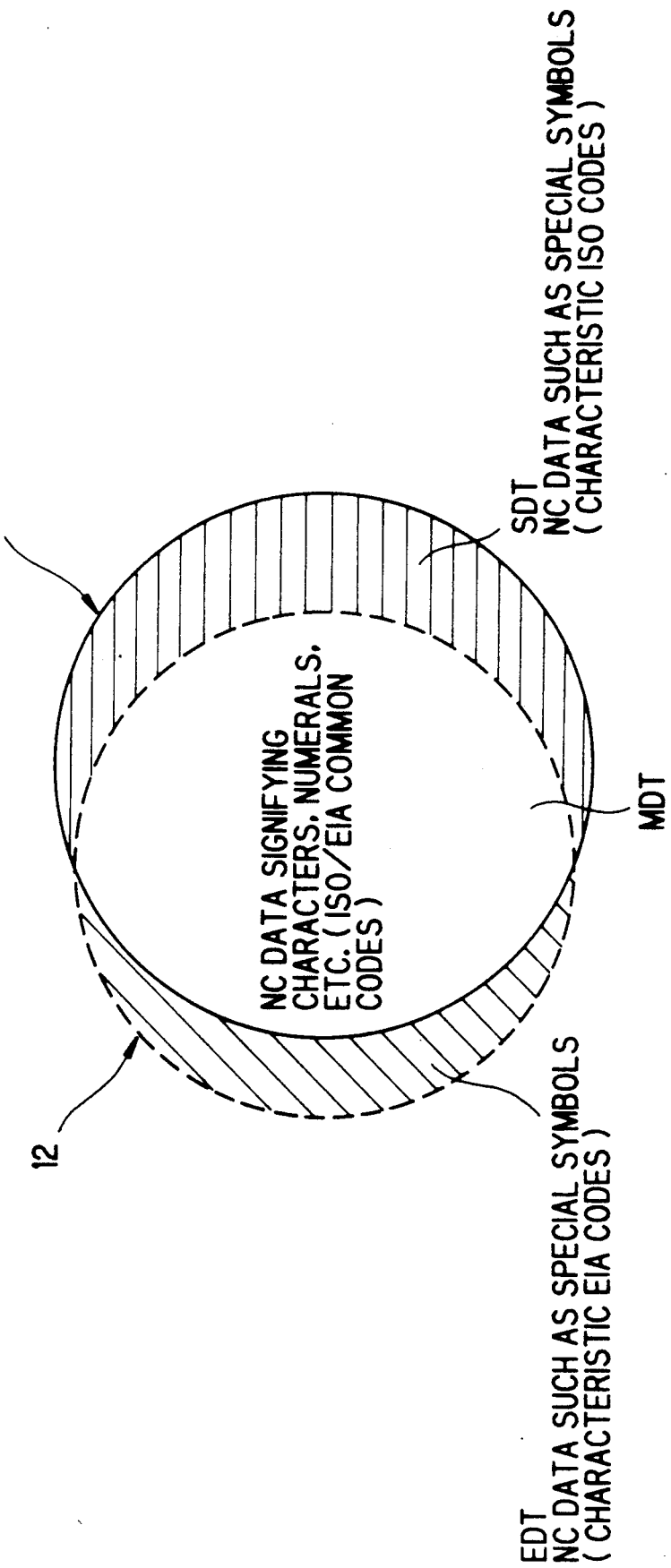
FIG. 2 is an explanatory chart for describing conversion of ISO/EIA codes into internal codes.

The conversion table EIT is for converting an eight-bit code, namely an ISO code (eight-bit even parity) and an EIA code (eight-bit odd parity) into respective internal codes. Characters, numerals and symbols sharing ISO and EIA codes are converted into the same internal code, and code unique to ISO and EIA codes which include undefined codes are converted into respective separate internal codes. FIG. 2 is an explanatory view for describing conversion of an ISO/EIA code into respective internal codes by the conversion table EIT. Numeral 11 denotes a group of NC data (the area in the circle indicated by the solid line) in which an ISO code has been converted into an internal code. Numeral 12 denotes a group of NC data (the area in the circle indicated by the broken line) in which an EIA code has been converted into an internal code. MDT represents a portion of the NC data in which characters, numerals and the like where the ISO and EIA codes both have the same meaning, thus they are converted into the same internal codes. SDT represents a portion of NC data in which special symbols, undefined codes and the like where only the ISO codes with a specific meaning are converted into internal codes. and EDT represents a portion of NC data in which special symbols, undefined codes and the like where only EIA codes of with a specific meaning are converted into internal codes.

The conversion table ICT is for converting an internal code into an ISO code. Internal codes (MDT, SDT in FIG. 2) corresponding to characters, numerals and symbols (defined codes) used in an ISO code system are converted into a predetermined ISO code, and internal codes (EDT in FIG. 2) corresponding to symbols (undefined codes) not used in an ISO code system are all converted into the same special code.

The conversion table ECT is for converting an internal code into an EIA code. Internal codes (MDT, EDT in FIG. 2) corresponding to characters, numerals and symbols (defined codes) used in an EIA code system are converted into a predetermined EIA code, and internal codes (SDT in FIG. 2) corresponding to symbols (undefined codes) not used in an EIA code system are all converted into the same special code.

Figure 3:
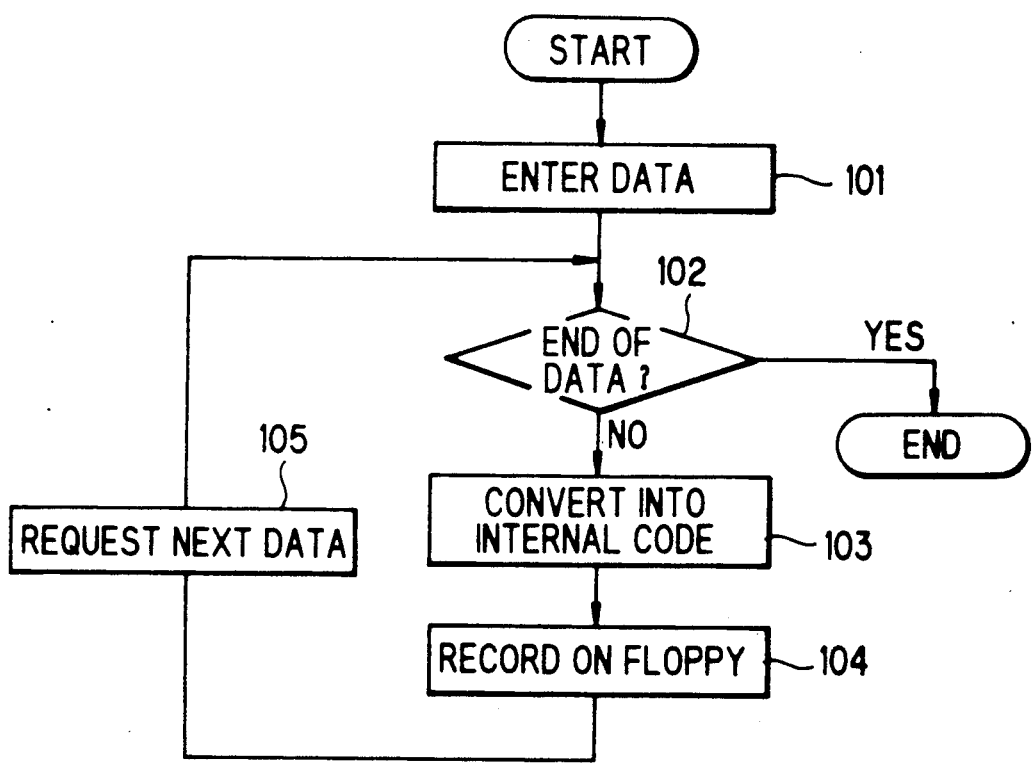
FIG. 3 is a flowchart of input conversion processing in the present invention.

FIG. 3 is a flowchart of input conversion processing according to the present invention. Input conversion processing for storing NC data, which is received from the host, on a floppy disk will now be described in accordance with the flowchart illustrated in FIG. 3.

First, when NC data arrive from the host via the serial interface 4, the processor 1 reads one character (code) of the NC data (step 101).

Next, it is determined whether the code read is a code indicating the end of the NC data (step 102). If the code read is an end code, an internal code indicative of end is stored on the floppy disk FD1 and input processing is terminated.

If the code read is not an end code, on the other hand, the code read is converted into a predetermined internal code (step 103) using the conversion table EIT and is then stored on the floppy disk FD1 (step 104). The next character is then read and processing from step 102 onward is repeated. More specifically, in the input conversion processing, the input code is converted into an internal code (see FIG. 2) using the conversion table EIT irrespective of whether the NC data is an ISO code or EIA code.

FIG. 4 is a flowchart of output conversion processing according to the present invention. Output conversion processing converts an internal code stored on a floppy disk into NC data of a predetermined code system and then outputting the same will now be described in accordance with the flowchart illustrated in FIG. 4.

First, the operator sets the output code system before the conversion is made. That is, by operating the ISO/EIA setting switch CSW on the operator's panel 5, a selection is made indicating whether the conversion is to be made to the ISO code or EIA code.

Thereafter, when an NC program number is designated and output conversion processing is started, the processor 1 reads one character (code) of the designated NC program from the floppy disk FD1 (step 201), checks to see whether the code indicates the end of the NC data (step 202). If the code indicates end of the NC data, the output conversion processing is terminated (step 202).

If the code does not indicate the end of the NC data, the processor 1 determines whether the code system selected by the ISO/EIA setting switch CSW is an ISO code or EIA code (step 203). If the code system selected is the ISO code, the internal code is converted into the ISO code using, the ion table ICT (step 204). If the code system selected is the EIA code, the internal code is converted into the EIA code using the conversion table ECT (step 205). It should be noted that the internal code EDT (see FIG. 2) is converted into a special code if the code system selected by the switch CSW is an ISO code system and that the internal code SDT is converted into a special code if the code system selected by the switch CSW is an EIA code.

Next, the processor 1 determines whether the result of conversion is a special code (step 206). If the result is a special code, no output is made and one character of the next internal code data is read out of the floppy disk FD1 (step 207) and processing beginning with step 202 is repeated.

If the result of conversion is not a special code, the code obtained by conversion is output and, for example, transferred to the host (step 208) via the serial interface 4. Likewise one character of the next internal code data is read out of the floppy disk FD1 (step 207), and processing from step 202 onward is repeated.

Since the present invention is constructed as described above, input data can be output as is, inclusive of characteristic codes, in a case where the input code system and output code system are the same. If the input code and output code differ, a code (characteristic code) not used in the output code system can be ignored, while outputting the input data which are convertable into the output code system.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. An ISO/EIA code conversion method in an NC data input/output apparatus capable of using an ISO code and an EIA code, said method comprising the steps of:
    (a) providing a first conversion table for converting an ISO code and an EIA code into an internal code, and a second table for converting an internal code into an ISO code and EIA code;
    (b) converting characters and numerals with common use of the ISO code and the EIA code into the same internal code using the first conversion table, and converting characters and numerals which do not make common use of the ISO code and the EIA code into separate internal codes;
    (c) storing the internal codes produced by said converting in step (b);
    (d) designating, at the time of output, one of the ISO code and EIA code as an output code system; and
    (e) converting the internal codes into the output code system using the second conversion table to produce NC data.

2. An ISO/EIA code conversion method according to claim 1, wherein the second conversion table has a first internal code conversion table for converting the internal code into an EIA code and a second internal code conversion table for converting the internal code into an ISO code, and wherein said converting in step (e) converts the internal codes being converted into the output code system using one of the first and second internal code conversion tables corresponding to the output code system.

3. An ISO/EIA code conversion method according to claim 2, wherein said method further comprises step (f) outputting the NC data produced by said converting in step (e), and wherein said outputting in step (f) does not output the NC data for the internal code undefined in the output code system.

4. An ISO/EIA code conversion method according to claim 3, wherein the first internal code conversion table converts the internal code corresponding to the internal code undefined in the EIA code system into a special code, wherein the second internal code conversion table converts the internal code corresponding to the internal code undefined in the ISO code system into a special code, and wherein said outputting in step (f) does not output the NC data for the internal code undefined in the output code system by not outputting the special codes.

5. A method for ISO/EIA code conversion, said method comprising the steps of:
 (a) receiving input numerical control data having an input code system corresponding to one of an ISO code and an EIA code;
 (b) converting the input numerical control data into an internal code;
 (c) storing the internal code produced by said converting in step (b);
 (d) designating one of the ISO code and the EIA code as an output code system;
 (e) converting the internal code stored in step (c) to the output code system to produce output numerical control data; and
 (f) outputting the output numerical control data.

6. A method according to claim 5, wherein said converting in step (b) comprises the steps of:
 (i) converting the input numerical control data into a common internal code when the input numerical control data is defined in both the ISO code and the EIA code; and
 (ii) converting the input numerical control data into separate internal codes when the input numerical control data is not defined in both the ISO code and the EIA code, and wherein said storing in step (c) stores the common internal code and the separate internal codes as the internal code.

7. A method according to claim 6, wherein the separate internal codes include a defined code and an undefined code for the input numerical control data, and wherein said converting in step (e) comprises the steps of:
 (i) converting the common internal code to output numerical control data irrespective of the output code system; and
 (ii) converting the defined code of the separate internal codes to output numerical control data when the input code system corresponds to the output code system.

8. A method according to claim 7, wherein said converting in step (e) further comprises step (iii) converting the undefined code of the separate internal codes to a special code when the input code system does not correspond to the output code system, and wherein said outputting in step (f) does not output numerical control data corresponding to the special code.

9. An numerical control apparatus capable of using an ISO code and an EIA code, comprising:

input means for receiving input numerical control data having an input code system corresponding to one of the ISO code and the EIA code;

first conversion means for converting the input numerical control data into an internal code;

storage means for storing the internal code;

selection means for selecting one of the ISO code and the EIA code as an output code system;

second conversion means for converting the internal code stored in said storage means to the output code system to produce output numerical control data; and output means for outputting the output numerical control data.

10. An apparatus according to claim 9, wherein said first conversion means converts the input numerical control data into a common internal code when the input numerical control data is defined in both the ISO code and the EIA code, and converts the input numerical control data into separate internal codes when the input numerical control data is not defined in both the ISO code and the EIA code, and wherein said storage means stores the common internal code and the separate internal codes as the internal code.

11. An apparatus according to claim 10, wherein the separate internal codes include a defined code and an undefined code for the input numerical control data, and wherein said second conversion means converts the common internal code to output numerical control data irrespective of the output code system, and converts the defined code of the separate internal codes to output numerical control data when the input code system corresponds to the output code system.

12. An apparatus according to claim 11, wherein said second conversion means further converts the undefined code of the separate internal codes to a special code when the input code system does not correspond to the output code system, and wherein said output means does not output numerical control data corresponding to the special code.

13. An ISO/EIA code conversion method in an NC data input/output apparatus which converts NC data based on an ISO code and an EIA code into NC data based on an internal code, stores the same, and converts the NC data based on the internal code into NC data based on the ISO code and EIA code and outputs the same, said method comprising the steps of:

(a) providing a first conversion table for converting the ISO code and the EIA code into an internal code, and a second table for converting an internal code into the ISO code and the EIA code;

(b) converting characters and numerals commonly using the ISO code and the EIA code into the same internal code using the first conversion table, and converting characters and numerals which do not make common use of the ISO code and the EIA code into separate internal codes;

(c) storing the internal codes produced by said converting in step (b);

(d) designating, at the time of output, one of the ISO code and EIA code as an output code system;

(e) converting the internal codes, corresponding to a defined code in the output code system, into the output code system using the second conversion table to produce NC data and converting the internal codes corresponding to an undefined code in the output code system into a special code; and (f) outputting the defined code and not outputting the special code.

* * * * *

UNITED STATES PATENT AND TRADEMARK OFFICE
CERTIFICATE OF CORRECTION

PATENT NO. : 5,028,923

DATED : JULY 2, 1991

INVENTOR(S) : MASAKI SEKI ET AL.

It is certified that error appears in the above-identified patent and that said Letters Patent is hereby corrected as shown below:

On the title page item:

[57] ABSTRACT,
        line 8, "code into" should be --code conversion table (ECT) for converting the internal code into--;

line 13, "being the" should be --being converted into the designated output code system using the--.

Col. 2, line 56, "code" (second occurrence) should be --codes--.

Col. 3, line 5, "codes. and EDT" should be --codes. EDT--.

Col. 4, line 4, "using, the ion" should be --using the conversion--.

Signed and Sealed this

First Day of December, 1992

*Attest:*

DOUGLAS B. COMER

*Attesting Officer*      *Acting Commissioner of Patents and Trademarks*